United States Patent
Mathiesen et al.

(10) Patent No.: US 11,205,144 B2
(45) Date of Patent: Dec. 21, 2021

(54) ASSESSMENT-BASED OPPORTUNITY EXPLORATION

(71) Applicant: Microsoft Technology Licensing, LLC, Redmond, WA (US)

(72) Inventors: Christian V. Mathiesen, Mountain View, CA (US); Emrecan Dogan, Menlo Park, CA (US); Alp Artar, Palo Alto, CA (US); Mustafa Emre Kazdagli, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 16/359,793

(22) Filed: Mar. 20, 2019

(65) Prior Publication Data
US 2020/0302371 A1 Sep. 24, 2020

(51) Int. Cl.
*G06Q 10/06* (2012.01)
*G06F 16/248* (2019.01)
*G06N 20/00* (2019.01)
*G06F 16/2457* (2019.01)

(52) U.S. Cl.
CPC ... *G06Q 10/063112* (2013.01); *G06F 16/248* (2019.01); *G06F 16/24578* (2019.01); *G06N 20/00* (2019.01); *G06Q 10/06398* (2013.01)

(58) Field of Classification Search
None
See application file for complete search history.

(56) References Cited

U.S. PATENT DOCUMENTS

| | | | |
|---|---|---|---|
| 7,310,626 B2 * | 12/2007 | Scarborough | G06Q 10/063 706/60 |
| 7,778,938 B2 | 8/2010 | Stimac | |
| 9,378,486 B2 | 6/2016 | Taylor et al. | |
| 10,528,916 B1 | 1/2020 | Taylor et al. | |
| 2002/0119433 A1 | 8/2002 | Callender | |
| 2003/0191680 A1 | 10/2003 | Dewar | |
| 2005/0246299 A1 | 11/2005 | Scarborough et al. | |

(Continued)

OTHER PUBLICATIONS

Barocas, Solon, Moritz Hardt, and Arvind Narayanan. "Fairness in machine learning." Nips tutorial 1 (2017): 2017. (Year: 2017).*

(Continued)

*Primary Examiner* — Thomas L Mansfield
(74) *Attorney, Agent, or Firm* — Schwegman Lundberg & Woessner, P.A.

(57) ABSTRACT

The disclosed embodiments provide a system for processing data. During operation, the system obtains a first assessment result related to a first qualification of a candidate. Next, the system filters a set of opportunities based on a first comparison of the first assessment result with qualifications for the opportunities to produce a first subset of opportunities. The system then selects a second qualification associated with some or all of the first subset of opportunities to assess for the candidate. The system also filters the first subset of opportunities based on a second comparison of a second assessment result related to the second qualification of the candidate with additional qualifications for the first subset of opportunities to produce a second subset of opportunities. Finally, the system outputs recommendations related to applying to the second subset of opportunities by the candidate.

18 Claims, 4 Drawing Sheets

(56) References Cited

U.S. PATENT DOCUMENTS

| | | | |
|---|---|---|---|
| 2007/0088601 | A1 | 4/2007 | Money et al. |
| 2011/0055098 | A1 | 3/2011 | Stewart |
| 2012/0084120 | A1* | 4/2012 | Hirsch ............... G06Q 30/0203 705/7.32 |
| 2012/0271774 | A1 | 10/2012 | Clegg |
| 2014/0122355 | A1 | 5/2014 | Hardtke et al. |
| 2015/0235160 | A1* | 8/2015 | Larlus-Larrondo .......................... G06Q 10/06398 705/7.42 |
| 2015/0302436 | A1 | 10/2015 | Reynolds |
| 2016/0162478 | A1* | 6/2016 | Blassin .......... G06Q 10/063112 706/12 |
| 2016/0196534 | A1* | 7/2016 | Jarrett ................ G06Q 10/1053 705/321 |
| 2017/0235848 | A1* | 8/2017 | Van Dusen ........... G06F 16/904 705/12 |
| 2017/0249595 | A1* | 8/2017 | Krupa ................ G06Q 30/0201 |
| 2018/0005191 | A1 | 1/2018 | Metrewar et al. |
| 2018/0133900 | A1 | 5/2018 | Breazeal et al. |
| 2018/0137527 | A1* | 5/2018 | Noelting ............ G06Q 30/0203 |
| 2018/0308062 | A1* | 10/2018 | Quitmeyer ......... G06Q 10/1053 |
| 2019/0114593 | A1* | 4/2019 | Champaneria ...... G06F 16/3325 |
| 2019/0122236 | A1 | 4/2019 | Terry et al. |
| 2019/0164107 | A1* | 5/2019 | Upadhyay ............ G06Q 10/109 |
| 2019/0188645 | A1 | 6/2019 | Monasor et al. |
| 2020/0167631 | A1 | 5/2020 | Rezgui et al. |
| 2020/0184422 | A1 | 6/2020 | Mondal et al. |
| 2020/0302368 | A1 | 9/2020 | Mathiesen et al. |
| 2020/0302370 | A1 | 9/2020 | Mathiesen et al. |
| 2020/0302397 | A1 | 9/2020 | Mathiesen et al. |

OTHER PUBLICATIONS

"Non Final Office Action Issued in U.S. Appl. No. 16/359,761", dated Oct. 27, 2020, 11 Pages.

"Non Final Office Action Issued in U.S. Appl. No. 16/359,777", dated Oct. 28, 2020, 14 Pages.

"Non Final Office Action Issued In U.S. Appl. No. 16/359,757", dated Mar. 25, 2021, 23 Pages.

"Final Office Action Issued in U.S. Appl. No. 16/359,761", dated May 21, 2021, 14 Pages.

"Final Office Action Issued in U.S. Appl. No. 16/359,777", dated May 25, 2021, 13 Pages.

"Notice of Allowance Issued in U.S. Appl. No. 16/359,777", dated Oct. 15, 2021, 9 Pages.

Gupta, Ankita, "Applying Data Mining Techniques in Job Recommender System for Considering Candidate Job Preferences", In 2014 International Conference on Advances in Computing, Communications and Informatics, Sep. 24, 2014, pp. 1458-1465.

"Notice of Allowance Issued in U.S. Appl. No. 16/359,761", dated Nov. 3, 2021, 9 Pages.

* cited by examiner

ASSESSMENT-BASED OPPORTUNITY EXPLORATION

RELATED APPLICATIONS

The subject matter of this application is related to the subject matter in a co-pending non-provisional application by the same inventors as the instant application and filed on the same day as the instant application, entitled "Screening-Based Opportunity Enrichment," having serial number TO BE ASSIGNED, and filing date TO BE ASSIGNED.

The subject matter of this application is also related to the subject matter in a co-pending non-provisional application by the same inventors as the instant application and filed on the same day as the instant application, entitled "Assessment-Based Qualified Candidate Delivery," having serial number TO BE ASSIGNED, and filing date TO BE ASSIGNED.

The subject matter of this application is also related to the subject matter in a co-pending non-provisional application by the same inventors as the instant application and filed on the same day as the instant application, entitled "Mapping Assessment Results to Levels of Experience," having serial number TO BE ASSIGNED, and filing date TO BE ASSIGNED.

BACKGROUND

Field

The disclosed embodiments relate to assessment of candidates. More specifically, the disclosed embodiments relate to techniques for performing assessment-based exploration of opportunities.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

Figure 1:
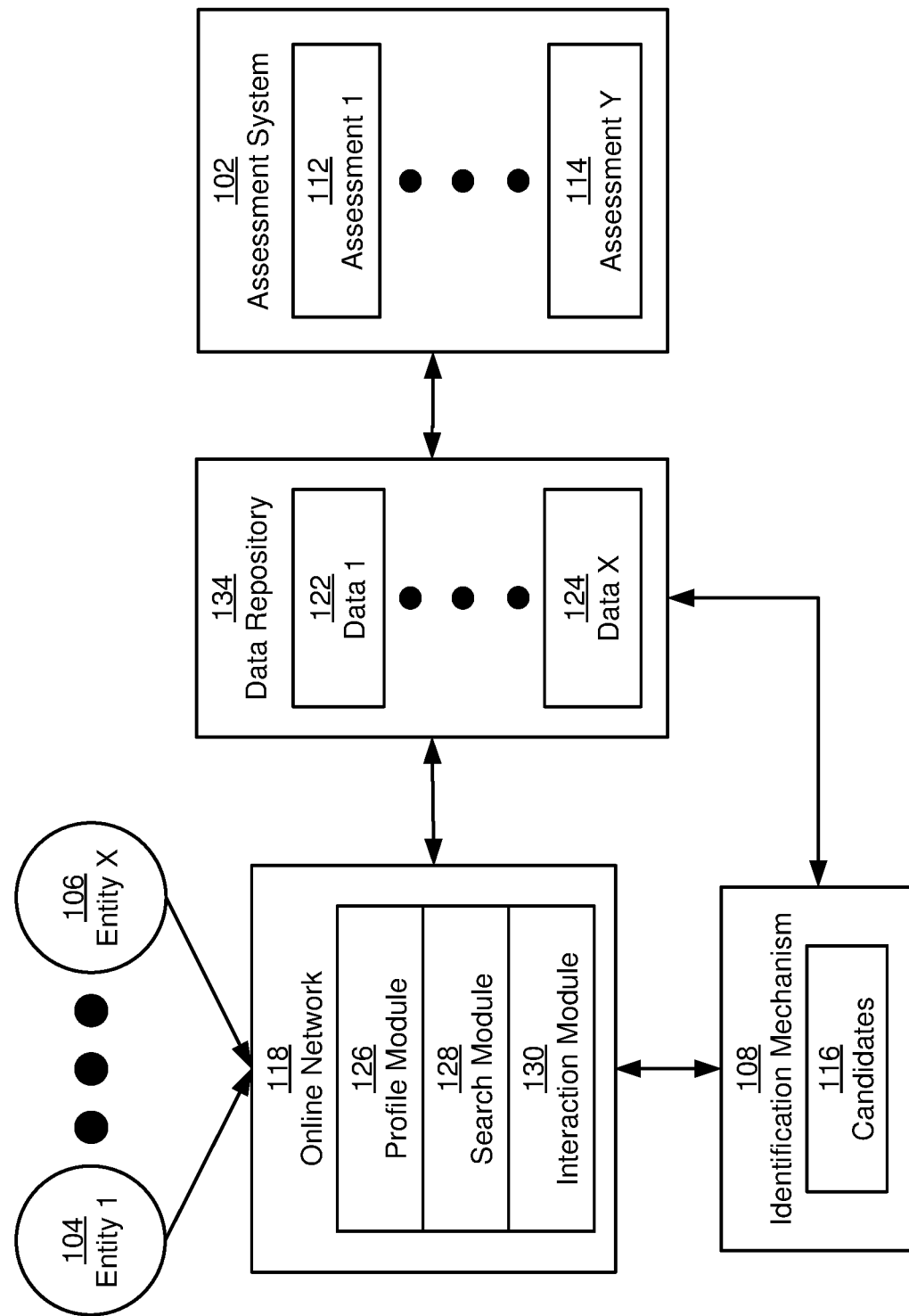
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for using assessments to improve targeting and placement of candidates with opportunities. In these embodiments, assessments include techniques and/or data that are used to determine qualifications of the candidates for the opportunities. For example, an assessment may include a screening question that is presented to a candidate to determine whether the candidate meets a corresponding requirement for a job. In another example, an assessment may include a skill assessment of a candidate, in which the candidate's proficiency in a corresponding skill is determined based on the candidate's answers to a series of questions related to the skill. As a result, assessments can be used to identify highly qualified candidates for the opportunities, thus reducing overhead associated with applying to and/or filling the opportunities.

More specifically, the disclosed embodiments provide a method, apparatus, and system for performing assessment-based opportunity exploration. In these embodiments, a series of assessments is adaptively selected for a candidate based on the candidate's career interests and/or the candidate's previous assessment results. For example, a candidate may specify his/her career interests as a preferred title, function, industry, seniority, type of employment (e.g., full-time, part-time, internship, temporary, etc.), location, and/or other attribute related to jobs and/or other opportunities for which the candidate may apply. The candidate's career interests may be matched to a set of jobs, and an initial assessment may be selected to optimize targeting of the candidate with jobs for which the candidate is qualified and/or to maximize the number of jobs for which the candidate is qualified. The candidate's assessment result for the initial assessment may be used to filter the set of jobs (e.g., by removing, from the set, jobs for which the candidate is not qualified), and another assessment is selected to continue optimizing for criteria related to matching the candidate with jobs. The candidate's job qualifications may thus be assessed in an adaptive manner until a stopping condition is reached, such as a certain time spent in assessments, the number of assessments conducted, the number of jobs to which the candidate is matched, and/or the confidence in a positive outcome between the member and a matched job. After the series of assessments is completed, recommendations related to remaining jobs for which the candidate is qualified are generated and outputted.

By adaptively selecting assessments for candidates and recommending jobs to the candidates based on results of the assessments, the disclosed embodiments expedite the matching of the candidates with jobs for which they are qualified. In turn, the matched and/or recommended jobs are more relevant or accurate than recommendations that do not account for candidate qualifications based on an adaptive series of assessments of a candidate. In contrast, conventional techniques may lack the ability to generate a series of assessment results in a way that optimizes for matching of candidates with jobs based on qualifications related to the assessment results. Instead, candidates may be required to manually search for and/or browse jobs for which the candidates are qualified and/or complete individual assessments for each job. Through conventional techniques, candidates spend large amounts of time taking individual assessments for jobs, applying for jobs and potentially interviewing for jobs to find out at the end they are not qualified for the job. The conventional techniques are inefficient for candidates and hiring entities. The embodiments described herein remove those inefficiencies and ensure that candidates are presented with jobs that will be of interest in terms of qualifications. Consequently, the disclosed embodiments may improve computer systems, applications, user experiences, tools, and/or technologies related to user recommendations, employment, recruiting, and/or hiring.

Assessment-Based Opportunity Exploration

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 may be inputted into the machine learning model(s), along with features and/or characteristics of the corresponding opportunities (e.g., required or desired skills, education, experience, industry, title, etc.). In turn, the machine learning model(s) may output scores representing the strengths of candidates 116 with respect to the opportunities and/or qualifications related to the opportunities (e.g., skills, current position, previous positions, overall qualifications, etc.). For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, patents, publications, reputation scores, etc.). The rankings may then be generated by ordering candidates 116 by descending score.

In turn, rankings based on the scores and/or associated insights may improve the quality of candidates 116, recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may recommend highly ranked candidates for a position to recruiters and/or other moderators as potential applicants and/or interview candidates for the position. In a fourth example, the component(s) may recommend jobs to a candidate based on the predicted relevance or attractiveness of the jobs to the candidate and/or the candidate's likelihood of applying to the jobs.

In one or more embodiments, rankings and/or recommendations related to candidates 116 and/or opportunities are generated based on assessments (e.g., assessment 1 112, assessment y 114) of candidates 116 with respect to the opportunities. Such assessments include techniques and/or data for verifying or ascertaining the qualifications of candidates 116 for the opportunities.

In one or more embodiments, assessments include screening questions that are presented to some or all candidates 116 for a given opportunity to determine whether candidates 116 meet requirements for the opportunity. Each screening question may specify a parameter and a condition associated with the parameter. For example, the screening question may ask a candidate to provide the number of years of experience he or she has with a skill (e.g., "How many years of programming experience do you have?"), tool (e.g., "How many years of work experience do you have using Microsoft Office?"), and/or other type of parameter representing a job-related qualification. In another example, a screening question may ask the candidate to provide a yes/no answer related to a language (e.g., "Do you speak Spanish?"), work authorization (e.g., "Are you authorized to work in the United States?"), license or certification (e.g., "Do you have a license or certification in CPR & AED"), location (e.g., "Are you willing to relocate to the SF Bay Area?"), and/or security clearance (e.g., "Do you possess a security clearance with the United States government?"), and/or other type of parameter representing a job-related qualification.

A candidate's answer to a screening question may then be compared with a value, range of values, set of values, and/or threshold associated with the corresponding parameter or qualification to identify one or more jobs for which the candidate is qualified or not qualified. For example, the candidate may be prompted to answer a series of screening questions for a specific job; if the candidate's answers to the screening questions meet the job's requirements, the candidate may be allowed to apply for the job. In another example, the candidate may opt in to a setting and/or preference that stores the candidate's previous answers to screening questions. In turn, the stored answers may be used to match the candidate to additional jobs and/or opportunities for which the candidate is qualified.

In one or more embodiments, assessments include skill assessments of candidates 116. Each skill assessment determines the proficiency of candidates 116 in a given skill based on the candidates' answers to a series of questions related to the skill. The skill assessment may be adaptive, in which the difficulty of a subsequent question is selected and/or adjusted based on the correctness of the candidate's answer's to previous questions in the skill assessment. After the candidate completes the skill assessment, a numeric rating (or score) for the candidate may be calculated based on the correctness of the candidate's answers to questions in the skill assessment and/or the difficulty of the questions. Consequently, screening questions, skill assessments, and/or other types of assessments can be used to identify highly qualified candidates for the opportunities, thus reducing overhead associated with applying to and/or filling the opportunities.

An assessment system 102 provided by and/or accessed through online network 118 interacts with candidates 116 to perform assessments of candidates 116. For example, assessment system 102 may form a part of a recruiting and/or job search product or tool offered by or through online network 118. As a result, assessment system 102 may integrate with other features of online network 118, such as profile module 126, search module 128, and/or interaction module 130. As a candidate browses and/or searches for jobs and/or other opportunities through online network 118, assessment system 102 may present the candidate with screening questions, skill assessments, and/or other types of assessments related to qualifications of the jobs and/or opportunities. Assessment system 102 may also, or instead, include modules or user-interface elements that allow candidates 116 to voluntarily provide answers to screening questions and/or take skill assessments separately from job searches or job browsing conducted by candidates 116.

In one or more embodiments, online network 118 and/or assessment system 102 include functionality to perform adaptive assessment-based opportunity exploration with candidates 116. For example, online network 118 and/or assessment system 102 may perform a series of assessments with a given candidate. Each successive assessment in the series may be selected based on qualifications of jobs that match the candidate's career interests, the candidate's previous assessment results in the series, and/or other selection criteria related to identifying jobs for which the candidate is qualified. In turn, assessment results collected over the series of assessments may be used to recommend jobs for which the candidate is qualified to the candidate and/or to recommend the candidate to moderators of jobs for which the candidate is qualified.

Figure 2:
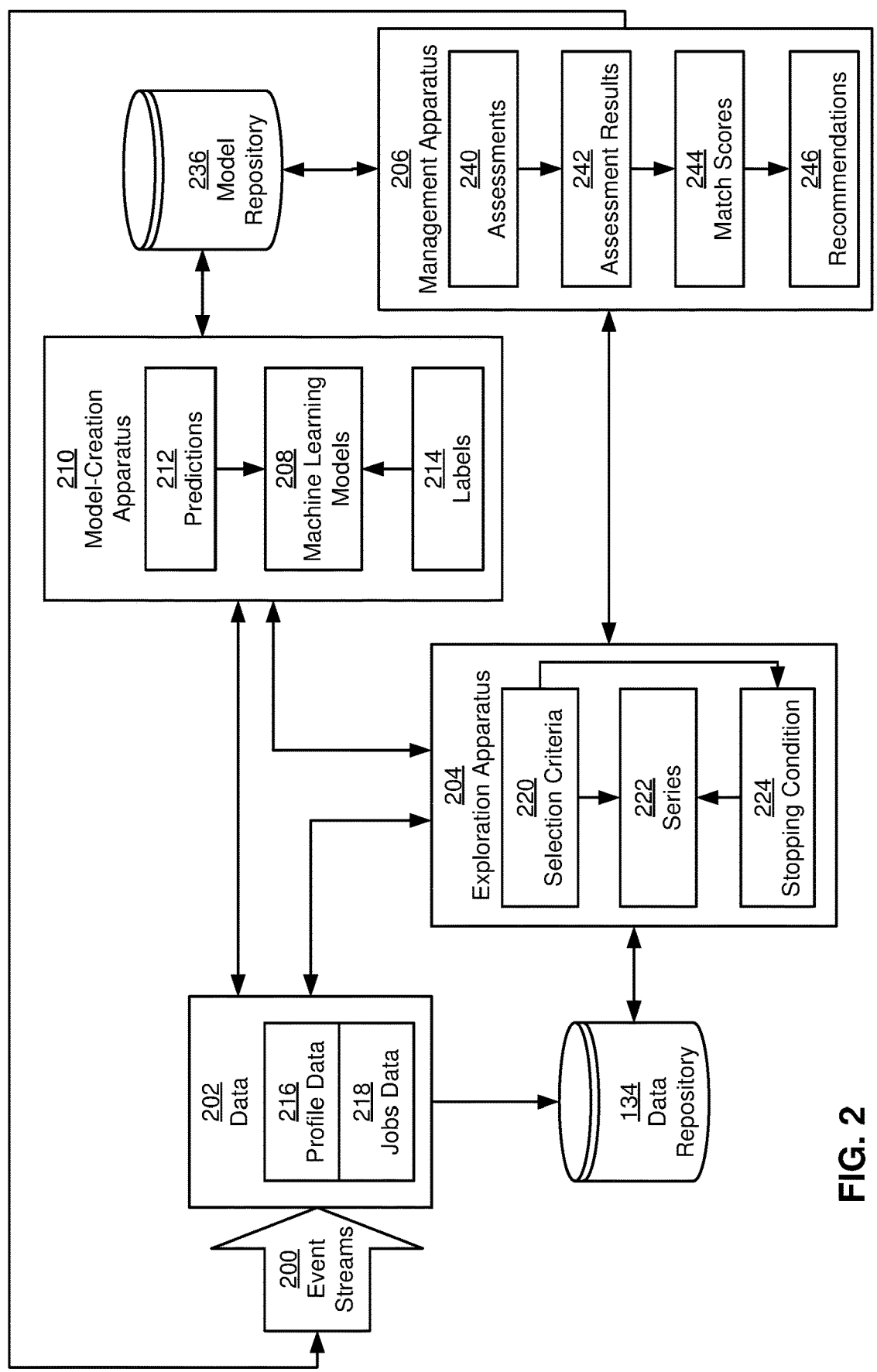
FIG. 2 shows a system for processing data in accordance with the disclosed embodiments.

As shown in FIG. 2, data repository 134 and/or another primary data store may be queried for data 202 that includes profile data 216 for members of an online network (e.g., online network 118 of FIG. 1), as well as jobs data 218 for jobs that are listed or described within or outside the online network. Profile data 216 includes data associated with member profiles in the online network. For example, profile data 216 for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. Profile data 216 may also include a set of groups to which the user belongs, the user's contacts and/or connections, awards or honors earned by the user, licenses or certifications attained by the user, patents or publications associated with the user, and/or other data related to the user's interaction with the platform.

Attributes of the members from profile data 216 may be matched to a number of member segments, with each member segment containing a group of members that share one or more common attributes. For example, member segments in the online network may be defined to include members with the same industry, title, location, and/or language.

Connection information in profile data 216 may additionally be combined into a graph, with nodes in the graph representing entities (e.g., users, schools, companies, locations, etc.) in the online network. Edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

Jobs data 218 may include structured and/or unstructured data for job listings and/or job descriptions that are posted and/or provided by members of the online network. For example, jobs data 218 for a given job or job listing may include a declared or inferred title, company, required or desired skills, responsibilities, qualifications, role, location, industry, seniority, salary range, benefits, education level, and/or member segment.

Jobs data 218 may also, or instead, include attributes related to screening questions, skill assessments, and/or other types of assessments 240 that are used to ascertain the qualifications of candidates (e.g., candidates 116 of FIG. 1) for the corresponding jobs. For example, a moderator of a job may specify a screening question for the job by selecting a category associated with the screening question, such as work experience, education, location, work authorization, language, visa status, certifications, expertise with tools, and/or security clearances. The moderator may then select from a set of available parameters and/or conditions associated with the category, such as values and/or thresholds representing requirements or qualifications for the job. In another example, the moderator may specify a required level of experience in a skill (e.g., a minimum of five years of experience in software development), which can be ascertained using a skill assessment for the skill.

In one or more embodiments, data repository 134 stores data 202 that represents standardized, organized, and/or classified attributes. For example, skills in profile data 216 and/or jobs data 218 may be organized into a hierarchical taxonomy that is stored in data repository 134. The taxonomy may model relationships between skills and/or sets of related skills (e.g., "Java programming" is related to or a subset of "software engineering") and/or standardize identical or highly related skills (e.g., "Java programming," "Java development," "Android development," and "Java programming language" are standardized to "Java"). In another example, locations in data repository 134 may include cities, metropolitan areas, states, countries, continents, and/or other standardized geographical regions. In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, jobs data 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

Data 202 in data repository 134 may further be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the community may be generated in response to the activity. The record may then be propagated to components subscribing to event streams 200 on a nearline basis.

A model-creation apparatus 210 trains and/or updates one or more machine learning models 208 using data 202 and/or features produced from data 202, labels 214 associated with the features, and predictions 212 produced by machine learning models 208 from the features. In general, model-creation apparatus 210 may produce machine learning models 208 that generate predictions and/or estimates related to the candidates' compatibility with jobs and/or moderators of the jobs.

First, model-creation apparatus 210 inputs a set of features for each candidate-job pair into one or more machine learning models 208 to obtain a prediction representing a match score between the candidate and job. For example, model-creation apparatus 210 may apply a logistic regression model, tree-based model, artificial neural network, and/or other type of machine learning model to attributes of the candidate and/or job to produce a score from 0 to 1 that represents the probability of a positive outcome involving the candidate and job (e.g., the moderator of the job responds to the candidate's application to the job, the candidate accepts a message from the moderator, etc.).

Next, model-creation apparatus 210 updates parameters of machine learning models 208 based on differences between match scores 244 and/or other predictions 212 outputted by machine learning model 208 and labels 214 associated with the predictions. For example, model-creation apparatus 210 may obtain and/or generate positive labels 214 for positive outcomes (e.g., views of candidate profiles, messages from moderators to candidates, adding candidates to hiring pipelines, scheduling interviews with candidates, hiring of candidates, etc.) between the candidates and jobs. Similarly, model-creation apparatus 210 may obtain and/or generate negative labels 214 for negative outcomes (e.g., rejecting candidates, ignoring candidates, etc.) between the candidates and jobs. After labels 214 are obtained or produced, model-creation apparatus 210 may use a training technique and/or one or more hyperparameters to update parameters (e.g., coefficients, weights, etc.) of machine learning models 208 based on features inputted into machine learning models 208 and the corresponding predictions 212 and labels 214.

After machine learning models 208 are created and/or updated, model-creation apparatus 210 stores parameters of machine learning models 208 in a model repository 236. For example, model-creation apparatus 210 may replace old values of the parameters in model repository 236 with the updated parameters, or model-creation apparatus 210 may store the updated parameters separately from the old values (e.g., by storing each set of parameters with a different version number of the corresponding machine learning model).

As mentioned above, the system of FIG. 2 includes functionality to perform assessment-based opportunity exploration, in which a series 222 of assessments 240 is presented to a candidate, and the candidate's assessment results 242 for assessments 240 are used to match the candidate to opportunities and/or generate recommendations 246 based on match scores 244 between the candidate and the opportunities. For example, the candidate may select and/or interact with a "job explorer" module or feature provided by management apparatus 206 and/or another component of the system. During the interaction, the candidate may participate in a customized series 222 of assessments 240 for the candidate. As the candidate completes individual assessments 240 in series 222, the component may obtain and/or store the candidate's corresponding assessment results 242, such as answers to screening questions and/or skill assessment ratings for the candidate. The component may input comparisons of assessment results 242 with qualifications and/or requirements of a set of jobs into one or more machine learning models 208 to generate match scores 244 between the candidate and the jobs. The component may then use a ranking of the jobs by match scores 244 and/or a comparison of match scores 244 with one or more thresholds to generate recommendations 246 related to the candidate and jobs, as discussed above. In other words, the assessment-based opportunity exploration functionality of the system may include an adaptive assessments-based experience that uses series 222 to collect assessment results 242 representing candidate qualifications and generates recommendations 246 of opportunities based on the candidate qualifications.

To conduct a given series 222 of assessments 240 in an assessment-based opportunity exploration with a candidate, an exploration apparatus 204 selects each assessment in series 222 based on a number of selection criteria 220. After the candidate completes the selected assessment, exploration apparatus 204 combines the candidate's assessment result for the completed assessment with selection criteria 220 to select a subsequent assessment in series 222. Exploration apparatus 204 may repeat the process of selecting each sequential assessment in series 222 based on previous assessment results 242 and/or other selection criteria 220 until a stopping condition 224 is reached.

In one or more embodiments, selection criteria 220 for assessments 240 in series 222 include career interests of the candidate. For example, the candidate may specify, through a job-seeking tool and/or the online network, his/her level of activeness in job-seeking, how soon he/she would like to move to a new job, preferred job titles for the new job, preferred locations and/or commute time for the new job, preferred job types (e.g., full time, part time, temporary, contract, internship, etc.) for the new job, preferred industries of the new job, preferred company sizes for the new job, and/or other preferences related to the candidate's career path. Exploration apparatus 204 may obtain the career interests from profile data 216 and/or other data 202 associated with the candidate in data repository 134 and match the career interests to jobs data 218 for a set of jobs.

In turn, exploration apparatus 204 uses jobs that match the candidate's career interests with additional selection criteria 220 to select each assessment in series 222. For example, exploration apparatus 204 may generate an initial "pool" of jobs that match the candidate's career interests as potential recommendations 246 related to the candidate. Exploration apparatus 204 may then select the first assessment in the series based on selection criteria 220 related to the pool of jobs. After an assessment result of the first assessment is received for the candidate, jobs for which the candidate is not qualified (based on the assessment result of the first assessment and corresponding requirements of the jobs) may be removed from the pool, and exploration apparatus 204 may select a second assessment by applying selection criteria 220 to the remaining jobs.

In some embodiments, additional selection criteria 220 used to select each assessment in series 222 include optimization objectives related to using assessment results 242 to match the candidate with jobs. Such selection criteria 220 may include, but are not limited to, maximizing the number of jobs for which the candidate is able to qualify and/or maximizing the highest possible match scores 244 between the candidate and one or more jobs matching the candidate's career interests. Each assessment in series 222 may thus be selected to resolve the greatest number of requirements and/or most important requirements for jobs that match the candidate's career interests and for which the candidate is still qualified (based on the candidate's assessment results 242 for previous assessments 240 in series 222). In turn, the candidate's assessment result for each selected assessment may be used to further filter the set of jobs in potential recommendations 246 and/or provide additional input to machine learning models 208 that can be used to improve the accuracy of match scores 244 between the candidate and the jobs.

In one embodiment, exploration apparatus 204 applies selection criteria 220 to parameters and/or output of machine learning models 208 associated with individual assessments 240 to select each assessment in series 222. For example, exploration apparatus 204 may initially retrieve parameters (e.g., coefficients, weights, etc.) of one or more machine learning models 208 that are used to generate match scores 244 between the candidate and a set of jobs that match the candidate's career interests. For each available assessment (e.g., screening question, skill assessment, etc.) in the system, exploration apparatus 204 may determine the importance of the assessment in qualifying the candidate for each job based on weights, coefficients, and/or other machine learning model parameters applied to a feature representing the assessment (or a corresponding job requirement or qualification) in machine learning models 208. Exploration apparatus 204 may also, or instead, input an encoding of each available assessment with respect to a corresponding qualification (or lack of qualification) of a job into one or more machine learning models 208 to generate a "partial" match score that indicates the importance of the qualification to the job and/or a moderator of the job.

Continuing with the previous example, exploration apparatus 204 may aggregate coefficients, weights, and/or partial match scores that characterize the importance of the assessments to placing the jobs to produce overall metrics indicating the importance of the assessments in qualifying the candidate for the maximum number of jobs and/or generating accurate or high match scores between the candidate and the jobs. Exploration apparatus 204 may then select the assessment with the highest overall metric as the next assessment to perform in series 222. After an assessment result for the selected assessment is received for the candidate, exploration apparatus 204 may remove jobs for which the candidate is not qualified (based on the assessment result and corresponding job requirements) from the set and repeat the process.

As mentioned above, exploration apparatus 204 may continue selecting assessments 240 in series 222 and filtering jobs from which potential recommendations 246 are generated based on the candidate's assessment results 242 for the selected assessments 240 until a stopping condition 224 is reached. For example, exploration apparatus 204 may discontinue series 222 after the candidate has been interacting with assessments 240 in series 222 for a given period (e.g., a number of minutes) and/or a certain number of assessment results 242 have been obtained for the candidate. Exploration apparatus 204 may also, or instead, stop series 222 after a threshold number of jobs for which the candidate is qualified is reached and/or the candidate has a high probability of a positive outcome with one or more jobs for which the candidate is qualified (e.g., based on match scores 224 between the candidate and jobs).

After the candidate has completed assessments 240 in series 222 up to stopping condition 224, management apparatus 206 uses match scores 244 between the candidate and remaining jobs that match the candidate's career interests (and/or other criteria for matching the candidate to jobs) and for which the candidate is qualified to generate recommendations 246 related to the candidate and the remaining jobs. For example, management apparatus 206 may generate recommendations 246 as search results of the candidates' job searches, search results of recruiters' candidate searches for specific jobs, job recommendations that are displayed and/or transmitted to the candidates, and/or within other contexts related to job seeking, recruiting, careers, and/or hiring. Recommendations 246 may be generated during the candidate's interaction with series 222 and/or after the candidate has completed all assessments 240 in series 222.

To generate recommendations 246, management apparatus 206 obtains representations of machine learning models 208 from model-creation apparatus 210, data repository 134, and/or another source. Next, management apparatus 206 uses machine learning models 208 and the corresponding features and/or data 202 to generate match scores 244 between the candidate and each remaining job. Match scores 244 may be produced in an offline, batch-processing, and/or periodic basis (e.g., from batches of candidate features 220, candidate-job features 222, and/or moderator features 224), or match scores 244 may be generated in an online, nearline, and/or on-demand basis (e.g., when a candidate or moderator logs in to the online network, views a job, performs a search, applies for a job, and/or performs another action).

As mentioned above, match scores 244 may be representations of predictions 212 from machine learning models 208. For example, management apparatus 206 may apply a logistic regression model, deep learning model, support vector machine, tree-based model, and/or another type of machine learning model to features for a candidate-job pair to produce a match score from 0 to 1. The match score may represent the likelihood of a positive outcome associated with the candidate and job, such as the probability that the candidate receives a response to a job application, given a submission of the application by the candidate; a moderator of the job views the candidate's profile; an interview of the candidate for the job is scheduled; the candidate is added to a hiring pipeline for the job; and/or the candidate is hired for the job.

In one or more embodiments, management apparatus 206 uses one or more thresholds with match scores 244 to derive insights related to response rates for applications and/or make recommendations 246 based on the insights. For example, management apparatus 206 may rank jobs for a candidate by descending match score and recommend, to the candidate, a pre-specified number or percentile of highest-ranked jobs and/or a variable number of jobs with match scores 244 that exceed a numeric threshold. In another example, management apparatus 206 may rank candidates by descending match score with a job and recommend, to the job's moderator, a pre-specified number or percentile of highest-ranked candidates and/or a variable number of candidates with match scores 244 that exceed a numeric threshold.

Management apparatus 206 and/or another component may additionally track responses to recommendations 246 and/or applications to the corresponding jobs. For example, the component may generate records and/or labels 214 for positive responses such as views of candidate profiles, messages from job moderators to candidates, scheduling of interviews for candidates, adding candidates to hiring pipelines, and/or hiring of candidates. The component may also, or instead, generate records and/or labels 214 for negative responses such as rejections of candidates by moderators and/or lack of action on candidates by the moderators after candidates apply to jobs.

In turn, model-creation apparatus 210 uses labels 214 associated with the responses to update machine learning models 208. For example, model-creation apparatus 210 may update parameters of machine learning models 208 so that machine learning models 208 better predict positive and negative labels 214 from the corresponding candidate-job features. As a result, the accuracy and/or relevance of recommendations 246 may improve over time.

By adaptively selecting assessments for candidates and recommending jobs to the candidates based on results of the assessments, the disclosed embodiments may expedite matching of the candidates with the jobs based on qualifications of the candidates for the jobs. In turn, the matched and/or recommended jobs may be more relevant or accurate than recommendations that do not account for candidate qualifications based on an adaptive series of assessments of a candidate. In contrast, conventional techniques may lack the ability to obtain a series of assessment results in a way that optimizes for matching of candidates with jobs based on qualifications related to the assessment results. Instead, candidates may be required to manually search for and/or browse jobs for which the candidates are qualified and/or complete individual assessments for each job. Consequently, the disclosed embodiments may improve computer systems, applications, user experiences, tools, and/or technologies related to user recommendations, employment, recruiting, and/or hiring.

Those skilled in the art will appreciate that the system of FIG. 2 may be implemented in a variety of ways. First, exploration apparatus 204, model-creation apparatus 210, management apparatus 206, data repository 134, and/or model repository 236 may be provided by a single physical machine, multiple computer systems, one or more virtual machines, a grid, one or more databases, one or more filesystems, and/or a cloud computing system. Exploration apparatus 204, model-creation apparatus 210, and management apparatus 206 may additionally be implemented together and/or separately by one or more hardware and/or software components and/or layers.

Second, a number of techniques may be used to generate series 222, match scores 244, recommendations 246, and/or other output used to improve the matching of candidates with jobs or opportunities. As described above, various components of machine learning models 208 (e.g., parameters, predictions 212, etc.) may be used to identify assessments 240 in series 222 that optimize matching of candidates to jobs or opportunities. Moreover, the functionality of machine learning models 208 may be provided by a regression model, artificial neural network, support vector machine, decision tree, naïve Bayes classifier, Bayesian network, clustering technique, collaborative filtering technique, deep learning model, hierarchical model, and/or ensemble model. One or more machine learning models 208 may additionally be customized and/or personalized to reflect the preferences and/or behavior of one or more candidates, moderators, and/or other entities involved in applying or hiring for the opportunities. The retraining or execution of machine learning models 208 may also be performed on an offline, online, and/or on-demand basis to accommodate requirements or limitations associated with the processing, performance, or scalability of the system and/or the availability of features and/or labels 214 used to train machine learning models 208.

Third, the system of FIG. 2 may be adapted to various types of opportunities and/or candidates. For example, the functionality of the system may be used to match candidates to academic positions, artistic or musical roles, school admissions, fellowships, scholarships, competitions, club or group memberships, matchmaking, collaborations, mentorships, and/or other types of opportunities.

Figure 3:
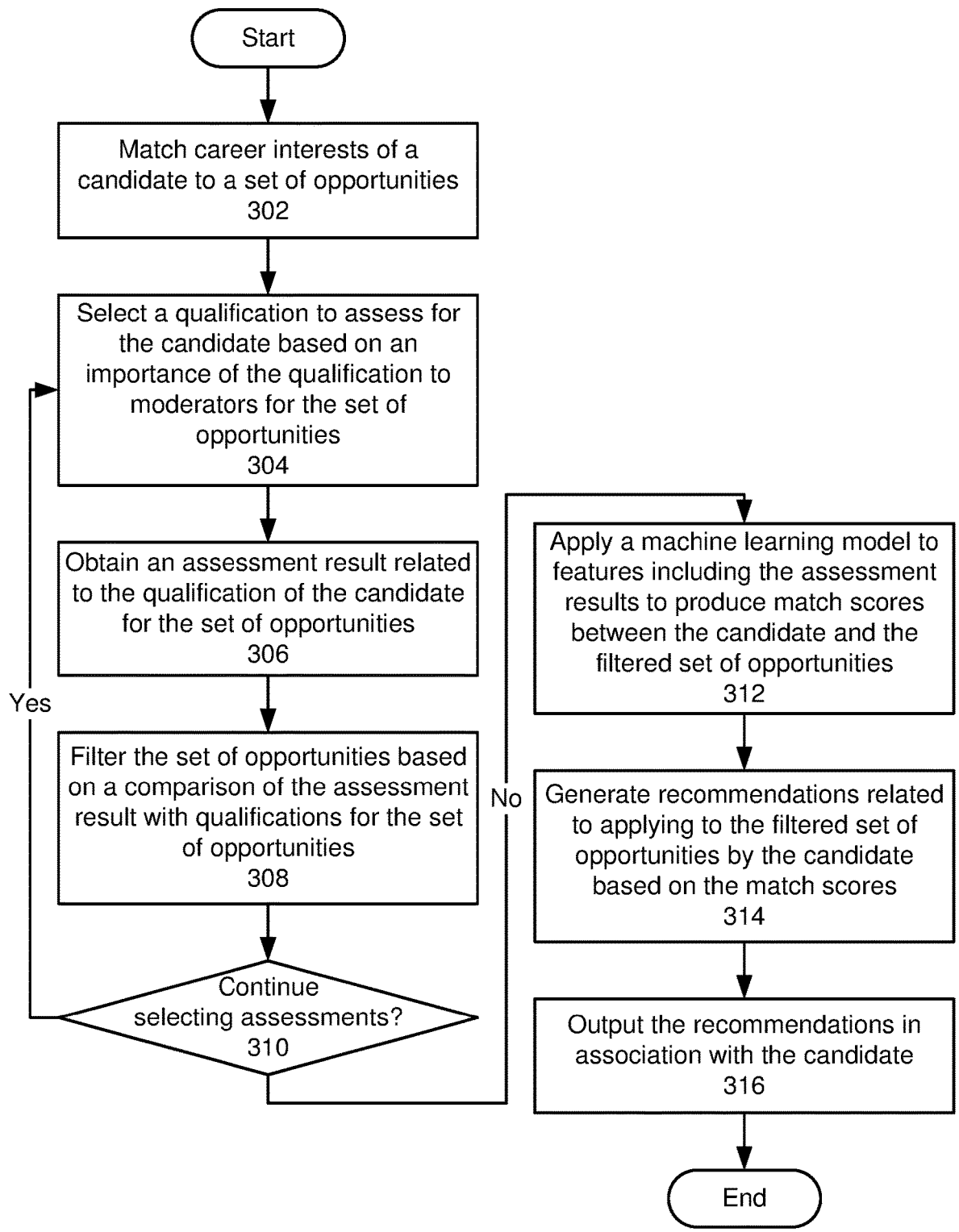
FIG. 3 shows a flowchart illustrating a process of performing assessment-based opportunity exploration in accordance with the disclosed embodiments.

FIG. 3 shows a flowchart illustrating a process of performing assessment-based opportunity exploration in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, career interests of a candidate are matched to a set of opportunities (operation 302). For example, the career interests may include a preferred industry, title, seniority, company size, type of employment, location, and/or other attribute associated with the candidate's desired next job. The career interests may be used as parameters of a query that is used to retrieve a set of matching jobs from a repository, such as data repository 134 of FIG. 1.

Next, a qualification to assess for the candidate is selected based on an importance of the qualification to moderators for the set of opportunities (operation 304). For example, the qualification may be selected from a set of available assessments for candidate qualifications and parameters and/or output of machine learning models that characterize the importance of the qualifications to moderators of the corresponding opportunities. To maximize the candidate's chances of qualifying for one or more opportunities in the set, the qualification associated with the highest parameter and/or output score from the machine learning models may be selected in operation 304.

An assessment result related to the qualification of the candidate for the set of opportunities is obtained (operation 306), and the set of opportunities is filtered based on a comparison of the assessment result with qualifications for the set of opportunities (operation 308). For example, the assessment result may include an answer to a screening question, skill assessment rating, and/or another representation of the candidate's qualification for a given attribute or skill. The assessment result may then be used to remove opportunities for which the candidate is no longer qualified from the set of opportunities (e.g., the candidate's lack of a security clearance identified in the assessment result may be used to omit opportunities that require a security clearance from the set).

Operations 304-308 may be repeated to continue selecting assessments (operation 310) for the candidate. For example, an adaptive series of assessments may be selected using operations 304-308 to generate assessment results that improve targeting and/or matching of the candidate with opportunities. The series of assessments and/or filtering of opportunities based on the corresponding assessment results may be discontinued after a stopping condition is reached, such as a certain time spent on assessing qualifications of candidate, a number of assessment results obtained for the candidate, a number of opportunities in the filtered set of the opportunities, and/or a high probability of a positive outcome between the candidate and one or more opportunities in the set.

After the series of assessments is completed or terminated, and used to identify a filtered set of opportunities for which the candidate is qualified, a machine learning model is applied to features including the candidate's assessment results to produce match scores between the candidate and the filtered set of opportunities (operation 312). For example, an encoding of comparisons of the candidate's assessment results with qualifications of the filtered set of opportunities may be inputted with additional features representing preferences of the candidate and/or a moderator of the additional opportunity into the machine learning model. In turn, the machine learning model may output, for each of the opportunities, a match score representing the likelihood of a positive interaction or outcome related to the candidate and the opportunity, such as the probability that the candidate receives a profile view, message, scheduled interview, and/or offer from the moderator after the candidate applies to the opportunity.

Recommendations related to applying to the filtered set of opportunities by the candidate are generated based on the match scores (operation 314) and outputted in association with the candidate (operation 316). For example, a threshold representing a high probability of a positive outcome may be applied to each match score. When the match score exceeds the threshold, a recommendation of the corresponding opportunity to the candidate (e.g., an indication that the candidate has a high likelihood of receiving a response from a moderator of the opportunity) and/or a recommendation of the candidate to the moderator (e.g., a notification to the moderator that the candidate is a good fit for the opportunity) may be generated and outputted. In another example, the opportunities may be ordered by descending match score, and a highest-ranked subset of opportunities may be outputted to the candidate as recommendations.

Figure 4:
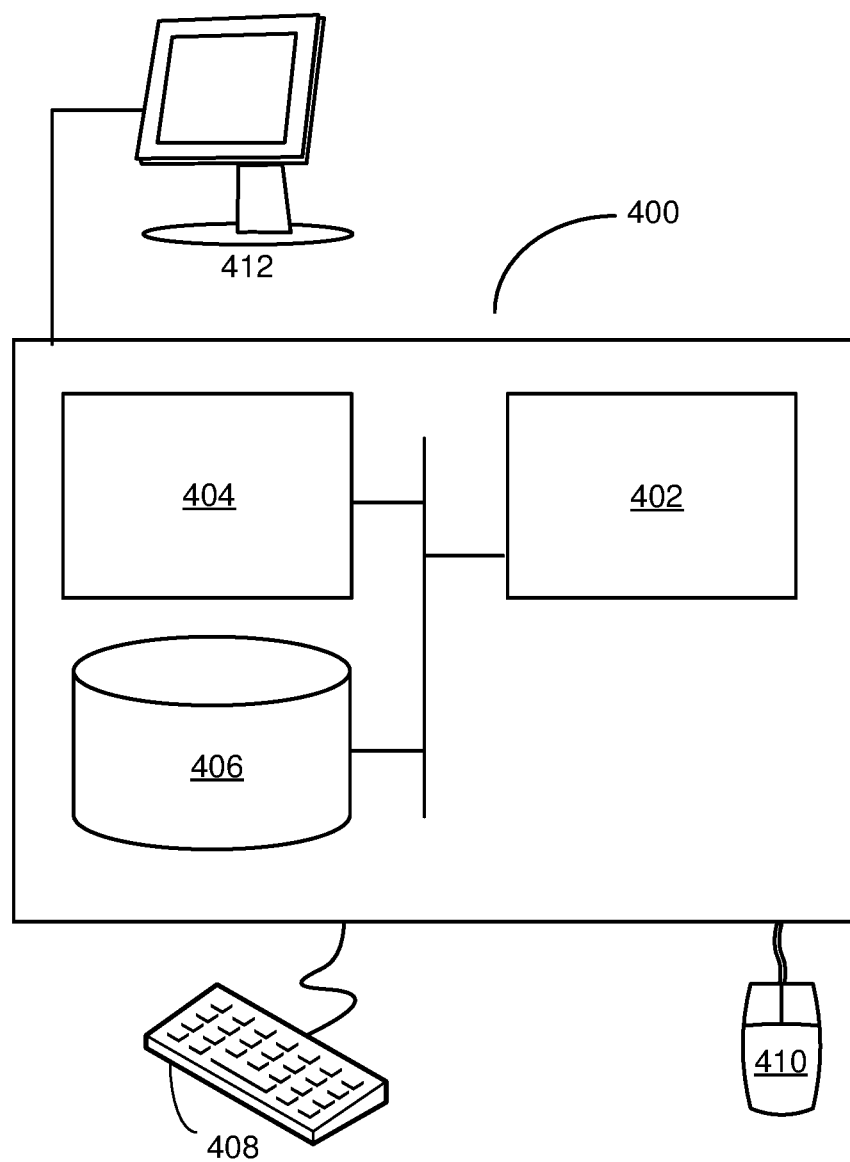
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for a user (e.g., a candidate and/or moderator for an opportunity). To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system includes an exploration apparatus and a management apparatus, one or more of which may alternatively be termed or implemented as a module, mechanism, or other type of system component. The management apparatus obtains a first assessment result related to a first qualification of a candidate for a set of opportunities and filters the set of opportunities based on a first comparison of the first assessment result with qualifications for the set of opportunities. The exploration apparatus selects a second qualification to assess for the candidate based on an importance of the second qualification to moderators for the set of the opportunities, and the management apparatus filters the set of opportunities based on a second comparison of a second assessment result related to the second qualification of the candidate with additional qualifications for the set of opportunities. Finally, the management apparatus outputs recommendations related to applying to the filtered set of opportunities by the candidate.

In addition, one or more components of computer system 400 may be remotely located and connected to the other components over a network. Portions of the present embodiments (e.g., exploration apparatus, model-creation apparatus, management apparatus, data repository, model repository, online network, etc.) may also be located on different nodes of a distributed system that implements the embodiments. For example, the present embodiments may be implemented using a cloud computing system that recommends opportunities to a set of remote candidates within or through an online network.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere h the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
identifying a set of employment opportunities based on a comparison of attributes of the employment opportunities with career interest criteria specified by a candidate;
subsequent to identifying the set of employment opportunities, obtaining a first assessment result related to a first qualification of the candidate;
filtering, by one or more computer systems, the set of employment opportunities based on a first comparison of the first assessment result with qualifications for the set of employment opportunities to produce a first subset of employment opportunities;
selecting, by the one or more computer systems, a second qualification associated with one or more employment opportunities from the first subset of employment opportunities to assess for the candidate;
obtaining a second assessment result related to the second qualification of the candidate;
filtering, by the one or more computer systems, the first subset of employment opportunities based on a second comparison of the second assessment result related to the second qualification of the candidate with additional qualifications for the first subset of employment opportunities to produce a second subset of employment opportunities;
applying as input features to a machine learned model the first and second assessment results to produce match scores between the candidate and the second subset of employment opportunities; and
outputting recommendations related to applying to one or more of the second subset of employment opportunities by the candidate.

2. The method of claim 1, further comprising:
matching a career interest of the candidate to the set of employment opportunities prior to obtaining the first assessment result.

3. The method of claim 2, wherein the career interest of the candidate comprises at least one of:
an industry;
a title;
a seniority;
a company size;
a type of employment; and
a location.

4. The method of claim 1, further comprising:
filtering the second subset of employment opportunities based on additional assessment results of the candidate for additional qualifications prior to outputting the recommendations.

5. The method of claim 4, wherein filtering the second subset of employment opportunities based on the additional assessment results of the candidate for the additional qualifications comprises:
discontinuing filtering of the second subset of employment opportunities upon detecting a stopping condition associated with assessment of the additional qualifications of the candidate.

6. The method of claim 5, wherein the stopping condition comprises at least one of:
an amount of time spent assessing qualifications of the candidate;
a number of assessment results obtained for the candidate;
a number of employment opportunities in the filtered set of employment opportunities; and
a high probability of a positive outcome between the candidate and one or more employment opportunities in the filtered set of employment opportunities.

7. The method of claim 1, wherein selecting the second qualification to assess for the candidate comprises:
identifying the importance of the second qualification to moderators for the first subset of employment opportunities based on parameters associated with the second qualification from one or more machine learning models.

8. The method of claim 1, wherein generating the recommendations based on the match scores comprises at least one of:
applying a threshold to a match score to determine a recommendation related to a corresponding employment opportunity; and
generating the recommendations based on an ordering of the second subset of employment opportunities by the match scores.

9. The method of claim 1, wherein the first assessment and the second assessment comprise:
an attribute; and
a condition associated with the attribute.

10. The method of claim 9, wherein the attribute comprises at least one of:
a title;
a description;
a function;
an industry;
a seniority level;
a type of employment;
a skill; and
an educational background.

11. The method of claim 1, wherein the first assessment and the second assessment comprise at least one of:
a screening question; and
a skill assessment.

12. A system, comprising:
one or more processors; and
memory storing instructions that, when executed by the one or more processors, cause the system to:
identify a set of employment opportunities based on a comparison of attributes of the employment opportunities with career interest criteria specified by a candidate;
subsequent to identifying the set of employment opportunities, obtain a first assessment result related to a first qualification of the candidate;
filter the set of employment opportunities based on a first comparison of the first assessment result with qualifications for the set of employment opportunities to produce a first subset of employment opportunities;
select a second qualification associated with one or more employment opportunities from the first subset of employment opportunities to assess for the candidate;
obtain a second assessment result related to the second qualification of the candidate;
filter the first subset of employment opportunities based on a second comparison of the second assessment result related to the second qualification of the candidate with additional qualifications for the first subset of employment opportunities to produce a second subset of employment opportunities;
apply as input features to a machine learned model the first and second assessment results to produce match scores between the candidate and the second subset of employment opportunities; and
output recommendations related to applying to the one or more employment opportunities in the second subset of employment opportunities by the candidate.

13. The system of claim 12, wherein the memory further stores instructions that, when executed by the one or more processors, cause the system to:
match a career interest of the candidate to the set of employment opportunities prior to obtaining the first assessment result.

14. The system of claim 12, wherein the memory further stores instructions that, when executed by the one or more processors, cause the system to:
filter the second subset of employment opportunities based on additional assessment results of the candidate for additional qualifications prior to outputting the recommendations; and
discontinue filtering of the second subset of employment opportunities upon detecting a stopping condition associated with assessment of the additional qualifications of the candidate.

15. The system of claim 14, wherein the stopping condition comprises at least one of:
an amount of time spent assessing qualifications of the candidate;
a number of assessment results obtained for the candidate;
a number of employment opportunities in the filtered set of employment opportunities; and
a high probability of a positive outcome between the candidate and one or more employment opportunities in the filtered set of employment opportunities.

16. The system of claim 12, wherein selecting the second qualification to assess for the candidate comprises:
identifying the importance of the second qualification to moderators for the set of employment opportunities based on parameters associated with the second qualification from one or more machine learning models.

17. A non-transitory computer-readable storage medium storing instructions that when executed by a computer cause the computer to perform a method, the method comprising:
   obtaining a first assessment result related to a first qualification of a candidate;
   filtering a set of employment opportunities based on a first comparison of the first assessment result with qualifications for the set of employment opportunities to produce a first subset of employment opportunities;
   selecting a second qualification associated with one or more opportunities from the first subset of employment opportunities to assess for the candidate;
   obtaining a second assessment result related to the second qualification of the candidate;
   filtering the first subset of employment opportunities based on a second comparison of the second assessment result related to the second qualification of the candidate with additional qualifications for the first subset of employment opportunities to produce a second subset of employment opportunities; and
   applying as input features to a machine learned model the first and second assessment results to produce match scores between the candidate and the second subset of employment opportunities; and
   outputting recommendations related to applying to one or more of the second subset of employment opportunities by the candidate.

18. The non-transitory computer-readable storage medium of claim 17, the method further comprising:
   matching a career interest of the candidate to the set of employment opportunities; and
   selecting the first qualification to assess for the candidate based on the importance of the first qualification to moderators for the set of employment opportunities.

* * * * *